United States Patent [19]
Eckhardt et al.

[11] Patent Number: 5,119,898
[45] Date of Patent: Jun. 9, 1992

[54] ELECTROMAGNETIC CONTROL APPARATUS FOR VARYING THE DRIVER STEERING EFFORT OF A HYDRAULIC POWER STEERING SYSTEM

[75] Inventors: Dennis C. Eckhardt, Saginaw; David W. Graber, Millington; Andrzej M. Pawlak, Troy; Bryan L. Faist, Frankenmuth, all of Mich.

[73] Assignee: General Motors Corporation, Detroit, Mich.

[21] Appl. No.: 602,567

[22] Filed: Oct. 24, 1990

Related U.S. Application Data
[63] Continuation-in-part of Ser. No. 392,164, Aug. 10, 1989, abandoned.

[51] Int. Cl.⁵ .............................................. B62D 5/22
[52] U.S. Cl. .................... 180/142; 180/143; 192/84 PM
[58] Field of Search .............. 180/141, 142, 143, 79.1; 192/84 PM, 84 T, 84 C; 310/266, 158

[56] References Cited

U.S. PATENT DOCUMENTS

| | | | |
|---|---|---|---|
| 3,602,749 | 8/1971 | Esters | 310/266 |
| 4,115,040 | 9/1978 | Knorr | 192/84 PM |
| 4,571,528 | 2/1986 | McGee et al. | 310/266 |
| 4,629,025 | 12/1986 | Brasier et al. | 180/142 |
| 4,731,554 | 3/1988 | Hall et al. | 310/266 |
| 4,765,427 | 8/1988 | Yonker | 180/143 |
| 4,778,021 | 10/1988 | Morishita et al. | 180/79.1 |
| 4,783,626 | 11/1988 | Shimizu | 180/79.1 |
| 4,871,040 | 10/1989 | Zuraski et al. | 180/142 |
| 4,886,137 | 12/1989 | Pawlak et al. | 180/142 |
| 4,886,138 | 12/1989 | Graber et al. | 180/142 |

*Primary Examiner*—Charles A. Marmor
*Assistant Examiner*—A. M. Boehler
*Attorney, Agent, or Firm*—Mark A. Navarre

[57] ABSTRACT

A hydraulic power steering system having conventional relatively rotatable spool and valve body elements for flow regulation, and an integral electromagnetic mechanism which effectively varies the centering force between the spool and valve body to adjust the level of steering assist provided for a given operator steering input. The electromagnetic mechanism includes a rotary magnetic circuit and a stationary magnetic circuit. The rotary magnetic circuit comprises a pair of radially displaced magnetic pole pieces which rotate with the input shaft and a permanent magnet ring element which is disposed between the pole pieces and which rotates with the pinion shaft. The stationary magnetic circuit includes an annular exciting coil disposed in proximity to the rotary magnetic circuit. The exciting coil is energized so as to vary the valve body/spool centering force, and hence the driver steering effort, with vehicle speed.

3 Claims, 8 Drawing Sheets

ELECTROMAGNETIC CONTROL APPARATUS FOR VARYING THE DRIVER STEERING EFFORT OF A HYDRAULIC POWER STEERING SYSTEM

This is a continuation-in-part of U.S. Ser. No. 07/392,164, filed Aug. 10, 1989, now abandoned.

This invention relates to an automotive hydraulic power assist steering system, and more particularly, to an electromagnetic control apparatus for varying the driver steering effort required to produce a given level of power assist.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body and to permit relative rotation therebetween in relation to operator exerted steering torque, at least within the limitations of the lost motion coupling.

In systems of the type described above, the level of driver steering effort assist required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

To overcome the engineering trade-off described above, various arrangements have been proposed for varying the driver steering effort for a given level of power assist as a function of vehicle speed. An example of one such arrangement is given in U.S. Pat. No. 4,629,025, issued to Brasier et al. Dec. 16, 1986, and assigned to the assignee of the present invention. In that arrangement, a controlled portion of the hydraulic fluid pump output is returned to the reservoir of the pump to reduce fluid flow to the steering actuator with increasing vehicle speed.

SUMMARY OF THE PRESENT INVENTION

The present invention is directed to a hydraulic power assist steering system having conventional relatively rotatable spool and valve body elements for flow regulation, and an integral electromagnetic mechanism which defines a coupling of variable resilience between the spool and valve body for adjusting driver steering effort required to produce a given level of power assist.

The integral electromagnetic mechanism of this invention includes a rotary magnetic circuit and a stationary electromagnetic circuit. The rotary magnetic circuit comprises a pair of relatively rotatable elements, one of which is toothed to conduct magnetic flux and one of which includes permanent magnets for establishing a permanent magnet coupling.

In the illustrated embodiment, the toothed element is defined by a pair of radially displaced magnetic pole pieces and the permanent magnet element is defined by a cylindrical ring element disposed between the magnetic pole pieces. The ring element is supported for rotation with the output (pinion) steering shaft and the pole pieces are supported for rotation with the input (operator driven) steering shaft. The ring element is radially magnetized to define an even number N of axially extending, alternating magnetic polarity sectors. The rotary pole pieces each have N/2 teeth extending toward the respective radial face of the ring element. The stationary electromagnetic circuit comprises at least one annular exciting coil and ferromagnetic pole element positioned adjacent to and magnetically coupled with the rotary magnetic pole pieces.

The above elements define two magnetic flux paths: a permanent magnet flux path which includes (neglecting leakage flux) only the rotary magnetic circuit elements, and an electromagnetic flux path which includes both the stationary and rotary magnetic circuit elements. The rotary pole pieces and the ring element are oriented such that (1) when the assembly is in the centered position, both flux paths are magnetically balanced, and (2) when there is relative rotation of the input and output steering shafts, the flux in the two paths develop in-phase centering forces which tend to restore the assembly to the centered position. The force due to the electromagnetic flux path is variable over a wide range depending on the magnitude and direction of current supplied to the coil, and such current may be scheduled in relation to the vehicle speed to provide a speed-dependent relationship between the operator input torque and the power assist torque.

According to a further aspect of this invention, magnetic asymmetry inherent due to axial and radial displacement of the rotary magnetic elements is corrected (1) by minimizing differential axial dimensions in the magnetic circuit, (2) by introducing an opposing asymmetry in the air gap between the pole pieces, and (3) by shaping the pole piece teeth.

In the illustrated embodiments, the mechanism of this invention is used in combination with a conventional torsion bar to define a variable resiliency coupling between the hydraulic fluid supply elements. The combination of the torsion bar and the permanent magnet flux path provide a coupling of intermediate resilience to generate an intermediate level of steering assist for a given driver steering input. Variably energizing the exciting coil with current of one polarity variably increases the resilience of the coupling so that more driver steering effort is required to produce a given level of power assist. Variably energizing the exciting coil with current of the opposite polarity variably decreases the resilience of the coupling so that less driver steering effort is required to produce a given level of power assist. Preferably, the coil energization is scheduled in relation to the speed of the vehicle so that the level of steering assist decreases with increasing vehicle speed. A driver preference input may also be used.

BRIEF DESCRIPTION OF THE DRAWINGS

FIG. 1b is a cut-away perspective view of the electromagnetic mechanism depicted in FIG. 1a.

FIG. 1c' is an enlarged view depicting relative dimensions of the integral electromagnetic mechanism of FIG. 1c.

DESCRIPTION OF THE PREFERRED EMBODIMENT

Figure 1A:
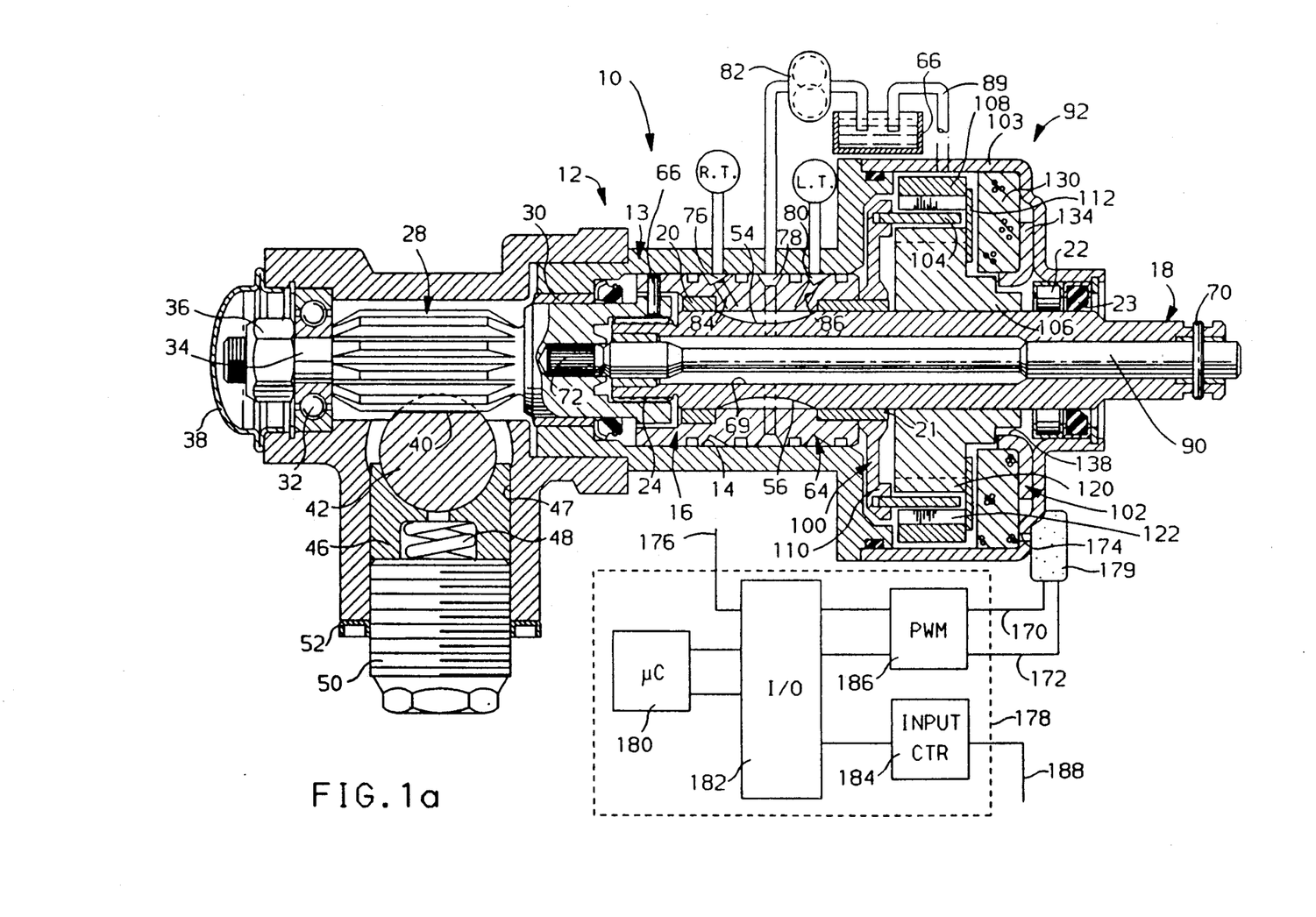
FIG. 1a is a sectional view of a hydraulic control valve assembly incorporating an integral electromagnetic mechanism according to a first embodiment of this invention, and a block diagram of a computer-based controller therefor.
Figure 1B:
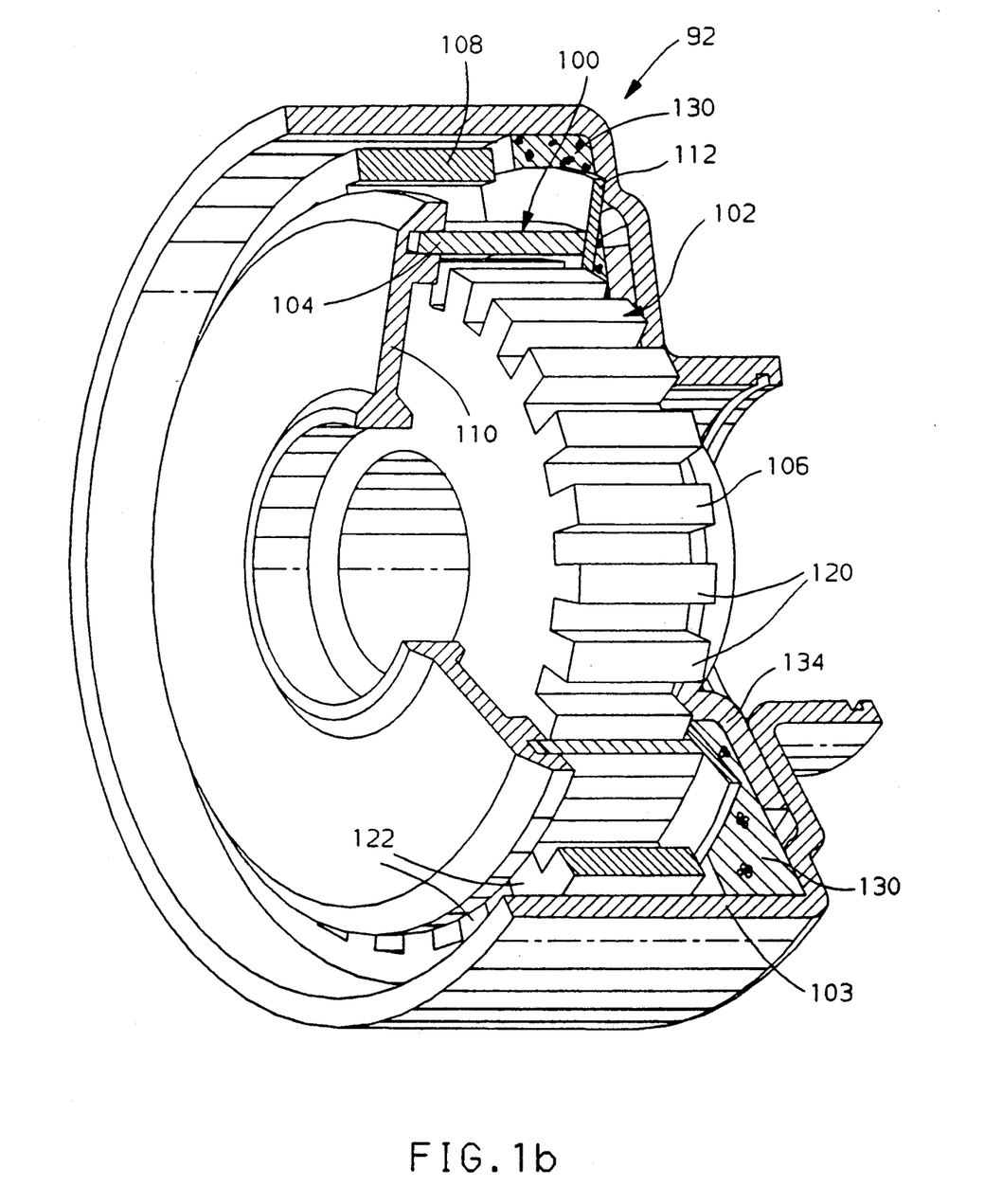

Referring to FIGS. 1a and 1b, the reference numeral 10 generally designates a portion of a motor vehicle hydraulic power assist rack and pinion steering gear. The steering gear 10 is disposed within a three-section housing 12, the midsection 13 of which defines a cylindrical smooth wall bore 14. A rotary power steering gear valve assembly 16 disposed within the bore 14 includes an elongated cylindrical spool shaft 18 and valve body 64 supported for independent turning movement in the housing 12.

The inboard end of spool shaft 18 is supported on the roller bearing 22, and projects through an annular fluid seal 23 for connection to a conventional steering shaft and operator manipulated handwheel, not shown. The outboard end of the spool shaft 18 is splined as indicated by the reference numeral 24 with an elongated pinion gear 28 to define a lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn (RT, LT) chambers of the power cylinder to apply right-hand or left-hand steering assist force to rack 42. A power cylinder meeting the above description is described in detail in U.S. Pat. No. 4,454,801 to Spann, issued Jun. 19, 1984, and assigned to the assignee of the present invention.

Close meshing engagement between the teeth of the pinion 28 and the rack 42 is achieved by the rack contact shoe 46 which is slidably mounted in the housing bore 47. A helical spring 48 seated between the contact shoe 46 and an adjusting plug 50, tensions the contact shoe 46. Plug 50 is threaded into the end of housing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve body 64 is rotatably mounted on valve spool 54 via sleeve bearings 20 and 21. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78, and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator) as indicated for generating a corresponding level of steering assist force in rack 42 as described above. An exhaust passage (not shown) within the valve returns hydraulic fluid to the fluid reservoir 66 of pump 82 via line 89. A similar valve 16 and hydraulic system is described in detail in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Together, the torsion bar 90 and electromagnetic mechanism 92 permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 and electromagnetic mechanism 92 center the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28.

The electromagnetic mechanism 92 comprises rotary and stationary magnetic circuits 100 and 102, respectively, disposed within a ferromagnetic housing section 103.

The stationary electromagnetic circuit 102 comprises an encapsulated annular exciting coil 130 supported on a partially encircling ferromagnetic pole element 134, which is secured to the housing section 103. The housing 103 and the pole surface 138 of pole element 134 are positioned in close proximity to the rotary magnetic circuit 100 to facilitate radial transfer of magnetic flux between the stationary and rotary magnetic circuits 102, 100. The lead ends 170, 172 of coil 130 pass through a suitable opening 174 in the housing 103 and are connected to the computer-based control unit 178 via the sealed connector 179.

The rotary magnetic circuit 100 comprises a cylindrical permanent magnet ring element 104 and a pair of rotary ferromagnetic pole pieces 106, 108. The ring element 104 is secured to a rotor hub 110, which is secured onto the outboard end of sleeve bearing 21 for rotation with valve body 64. The pole piece 106 is secured onto the inboard end of spool shaft 18 for rotation therewith. The ring 112 rigidly couples the pole piece 108 to the pole piece 106, and establishes a predetermined angular alignment therebetween as explained below. The hub 110 is sized in relation to the pole piece 106 such that in the completed assembly, the ring element 104 is positioned approximately midway between the pole pieces 106 and 108.

Figure 2A:
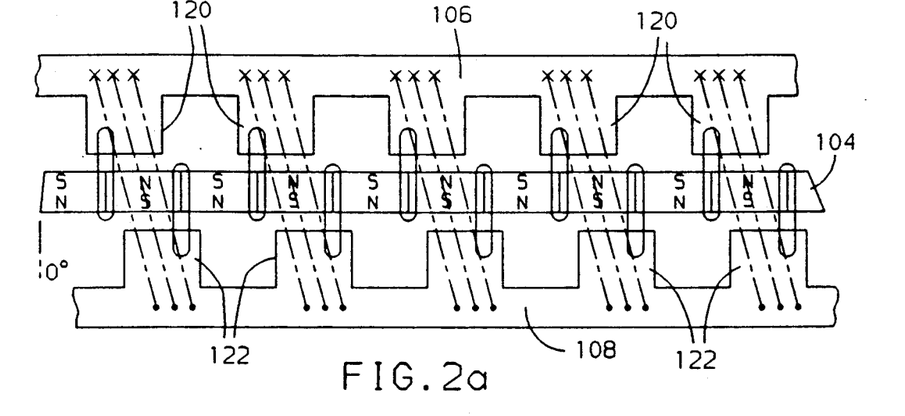
FIGS. 2a, 2b and 2c schematically depict a linearized view of the rotary magnetic circuit of the electromagnetic mechanisms of FIGS. 1a-1d.
Figure 2B:
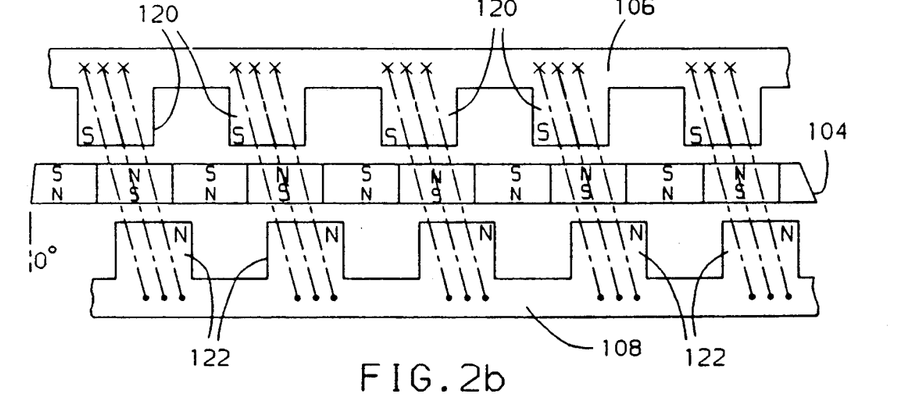
Figure 2C:
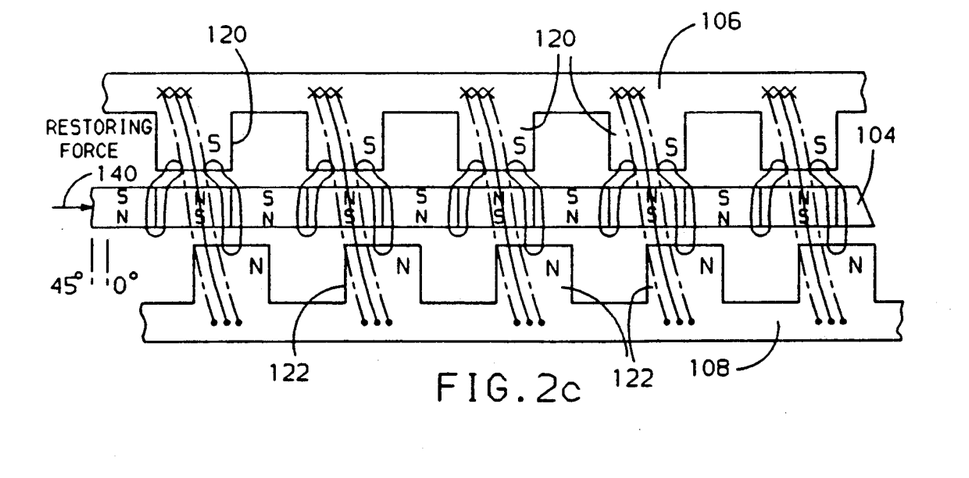

As seen more clearly in the linearized representation of FIGS. 2a-2c, the permanent magnet ring element 104 is radially magnetized to define an even number N of axially extending, alternating magnetic polarity sectors, and the pole pieces 106, 108 each have N/2 homopolar teeth 120, 122 extending toward the radial faces of the ring element 104. The teeth 120, 122 are angularly offset by approximately ¼ pole pitch, and the ring element 104 is oriented such that its magnetic sectors are offset from like polarity teeth of the rotary pole pieces 106, 108 by ¼ pole pitch when the valve spool 54 and valve body 64 are centered.

Figure 1C:
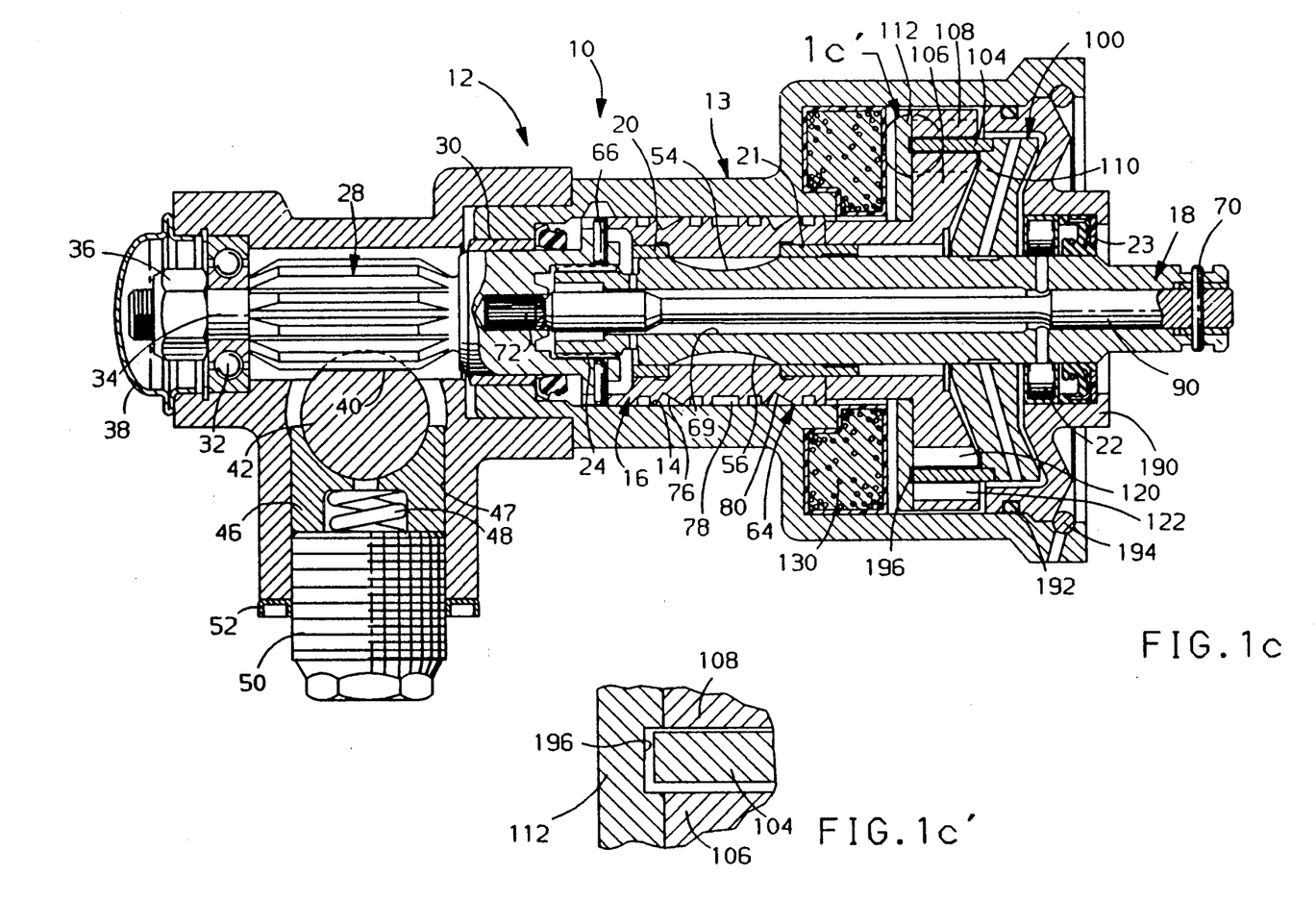
FIG. 1c is a sectional view of a hydraulic control valve assembly incorporating an integral electromagnetic mechanism according to a second embodiment of this invention.
Figure 1D:
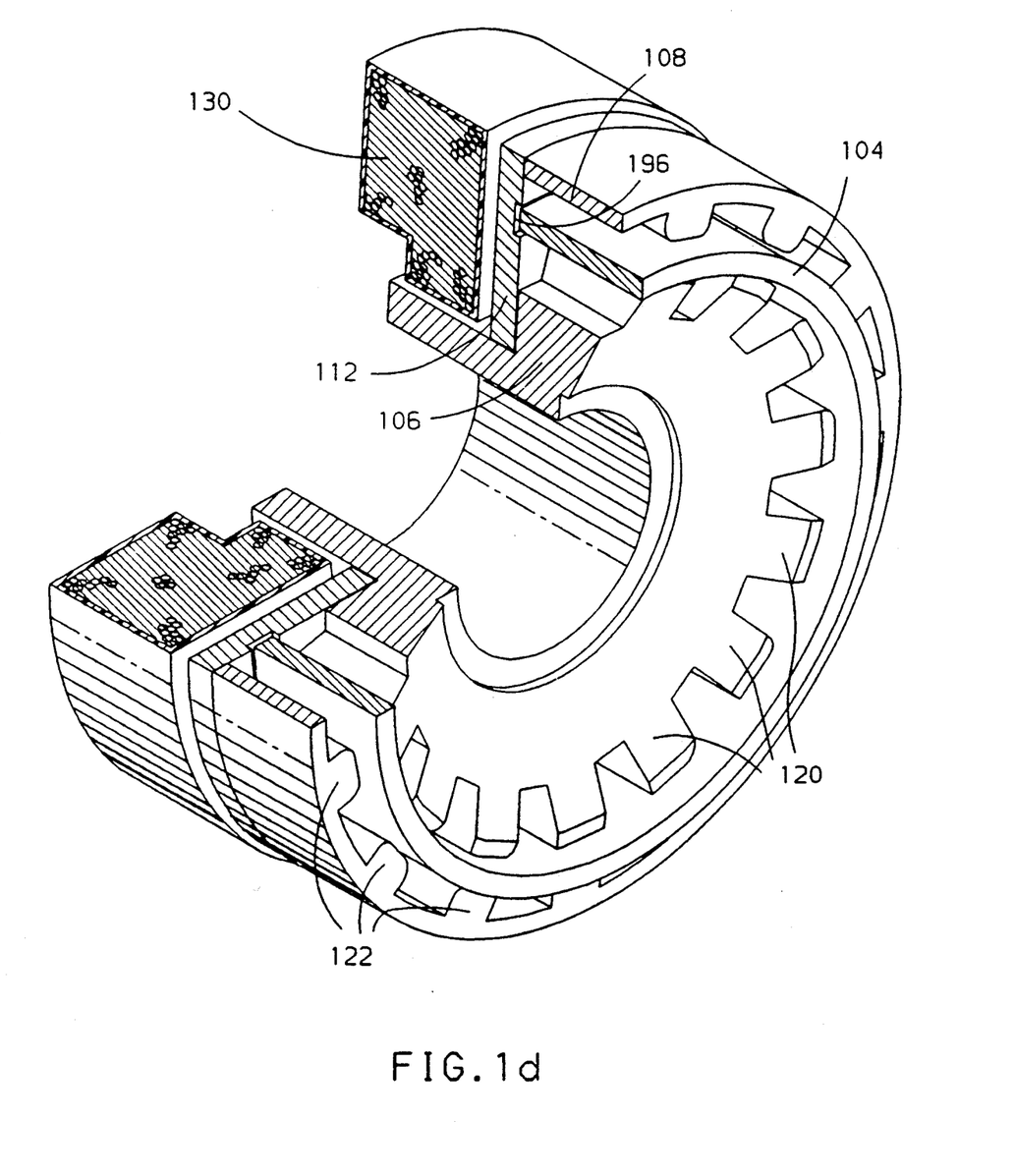
FIG. 1d is a cut-away perspective view of the electromagnetic mechanism depicted in FIG. 1c.
Figures 1E, 1F, 1G, 1H:
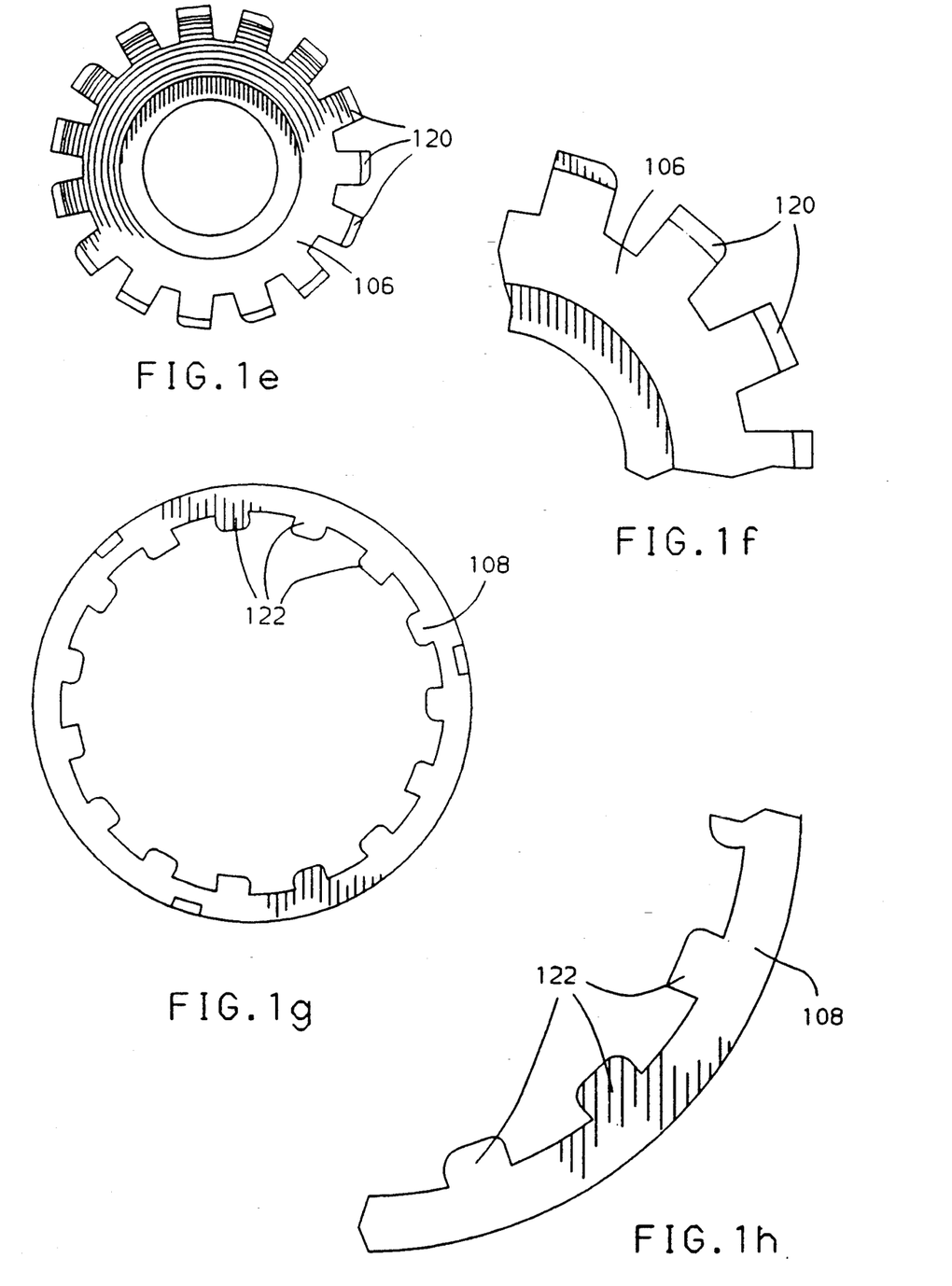
FIGS. 1e, 1f, 1g and 1h depict rotary pole pieces of the electromagnetic mechanism depicted in FIGS. 1c-1d.

A second embodiment of the electromagnetic mechanism of this invention is depicted in FIGS. 1c, 1c' and 1d. Various elements corresponding to the elements described in reference to the first embodiment of FIGS. 1a-1b have been assigned corresponding reference numerals. However, the control unit 178 and other steering system hydraulic elements have been omitted from FIG. 1c for convenience.

Although functionally similar to the embodiment of FIGS. 1a-1b, the second embodiment incorporates several distinguishing features. For example, the placement of the permanent magnet ring element 104 and the ferromagnetic pole pieces 106, 108 is reversed, compared to the first embodiment. Thus, the pole piece 106, rigidly coupled to the pole piece 108 via ring 112, is secured on the outboard end of sleeve bearing 21 for rotation with valve body 64. The rotor hub 110 onto which ring element 104 is secured, in turn, is secured on the inboard end of spool shaft 18 for rotation therewith. A separate nonmagnetic end cover 190 captures the bearing 22 and fluid seal 23. The end cover 190 is sealed against housing 13 by the O-ring 192, and is retained within housing 13 by the retainer ring 194.

The above construction permits the exciting coil 130 to be placed inboard of the rotary magnetic circuit 100. As a result, the valve body 64 becomes part of the magnetic flux path, eliminating the need for the separate pole element 134 of FIGS. 1a-1b. With the subject embodiment, the magnetic flux path simply encircles the coil 130 via housing midsection 13, valve body 64, rotary pole pieces 106, 108 and magnet ring element 104.

Another feature of the embodiment depicted in FIGS. 1c, 1c' and 1d addresses an axial asymmetry in the rotary magnetic circuit 100. Axial asymmetry occurs in both embodiments if the permanent magnet is not axially centered between the toothed pole pieces 106, 108. A certain amount of this axial asymmetry is inherent since the magnet ring 104 is supported from one end only—from the inboard end in the first embodiment, and from the outboard end in the second embodiment. The magnetic circuit 100 tries to balance the asymmetry, pulling the magnet ring 104 away from the rotor hub 110. The effect of the axial asymmetry can be mitigated in the second embodiment of FIGS. 1c-1d by extending the axial length of magnet ring 104 into a recess 196 formed in the pole piece ring 112. This requires an increased axial dimension of ring 112, a luxury afforded by the magnetic circuit arrangement of the second embodiment.

The magnetic circuits 100 of the first and second embodiments also share an inherent radial asymmetry. The radial asymmetry occurs because of dimensional differences in the pole piece teeth 120 and 122. Even if the teeth 120, 122 have similar radial dimensions and are equally spaced from the ring magnet 104, as depicted in the linearized representation of FIGS. 2a-2c, the radial displacement introduces a difference in their effective magnetic air gaps relative to the ring magnet 104. As the ring magnet 104 rotates relative to the teeth 120, 122, the radial asymmetry produces a cogging torque which may be out of phase with the centering torque produced by the exciting coil 130.

To mitigate the effects of the above-described radial asymmetry, this invention contemplates a differential air gap as best seen in FIG. 1c' and a shaping of the teeth 120, 122 as shown in FIGS. 1e-1h. Referring to FIG. 1c', the air gap between ring magnet 104 and the teeth 122 of outer pole piece 108 is significantly smaller than the air gap between ring magnet 104 and the teeth 120 of inner pole piece 106. This feature significantly reduces the magnetic cogging torque without significantly affecting the magnitude of the centering torque produced by the exciting coil 130. The tooth shaping comprises a rounding of the tooth profile, to a greater extent on the teeth 122 of outer pole piece 108 than on the teeth 120 of inner pole piece 106. The differential air gaps and tooth shaping together act to mitigate radial asymmetry inherent in the radial magnetic circuit mechanization of this invention, producing a more nearly linear overall centering torque for the valve body 64 and valve spool 54.

As shown in FIGS. 2a-2c, the magnetic circuit elements of both embodiments of this invention define two magnetic flux paths: a permanent magnet flux path which includes only the rotary magnetic circuit elements 104, 106, 108, and an electromagnetic flux path. In the first embodiment, the electromagnetic flux path additionally includes the stationary magnetic circuit elements 103 and 134; in the second embodiment, the electromagnetic flux path additionally includes the housing 13 and the valve body 64.

Referring to FIGS. 2a and 2c, magnetic flux flowing in the permanent magnet flux path is produced solely by the permanent magnets of ring element 104. Such flux exists independent of the stationary pole element 134.

When the valve spool 54 and valve body 64 are centered, as in FIG. 2a, no magnetic centering force (torque) is produced. When there is a relative displacement of the valve spool 54 and valve body 64, as in FIG. 2c, the magnetic forces generated by the flux in the permanent magnet flux path become imbalanced and develop a resultant restoring (centering) force in the direction of the arrow 140, with or without energization of the exciting coil 130. Such force varies as a function of relative displacement, as graphically represented by the idealized trace 144 in FIG. 3.

Referring to FIGS. 2b and 2c, and ignoring the effect of the permanent magnets, magnetic flux flowing in the electromagnetic flux path is produced primarily by energization of the stationary magnetic circuit exciting coil 130. As indicated by the broken lines, such flux enters the rotary pole piece 108 (NORTH) via the housing section 103, and exits the rotary pole piece 106. When the valve spool 54 and valve body 64 are centered, as in FIG. 2b, no magnetic centering force is developed. When there is a relative displacement of the valve spool 54 and valve body 64, as in FIG. 2c, the magnetic forces generated by the flux in the electromagnetic flux path become imbalanced and develop a resultant restoring (centering) force in the direction of the arrow 140. Such force varies as a function of coil energization and relative displacement, the force for a given coil current magnitude being depicted as a function of relative displacement by the idealized traces 142 and 142' in FIG. 3.

Figure 3:
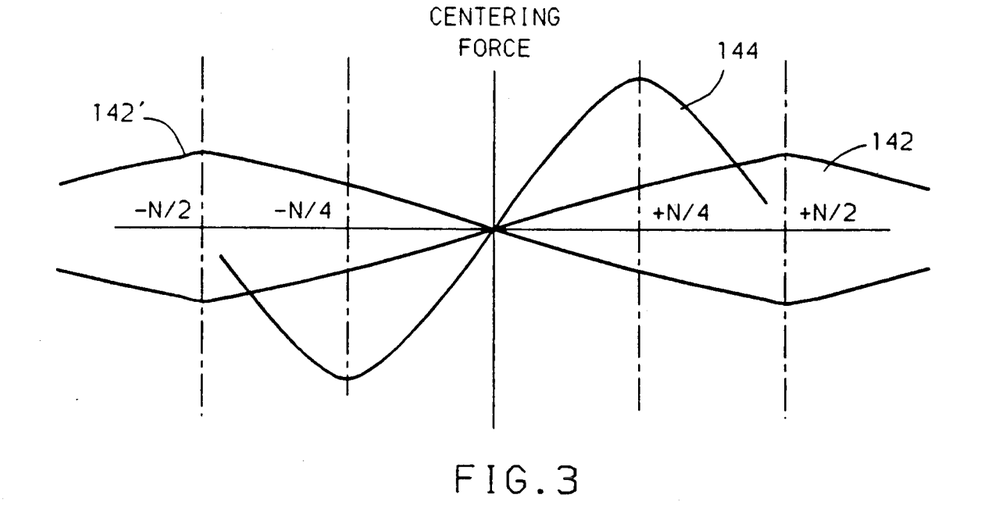
FIG. 3 depicts the centering forces generated by the electromagnetic mechanisms of FIGS. 1a-1d as a function of steering shaft rotation for a given vehicle speed.

The electromagnetic centering force represented by the trace 142 in FIG. 3 is produced by energizing the exciting coil 130 with a given current of a first polarity. Such force is additive to the permanent magnet centering force (trace 144), at least for relative displacements of plus or minus one-quarter (N/4) pole pitch (4.5 mechanical degrees in the illustrated embodiment) or less, where N is the number of magnetic sectors in the rotary ring element 104. The electromagnetic centering force represented by the trace 142' in FIG. 3 is produced by energizing the exciting coil 130 with current of the same magnitude, but of opposite polarity. Such force is subtractive to the permanent magnet centering force, at least for relative displacements of ±N/4 pole pitch or less.

The effective resiliency of the coupling between valve spool 54 and valve body 64 is determined by the sum of the centering forces of the torsion bar 90, the permanent magnet flux path, and the electromagnetic flux path. The combined centering force is depicted as a function of relative displacement in FIG. 4. The torsion bar and permanent magnet flux path forces are fixed for a given installation, but the electromagnetic flux path force is variable with the exciting coil energization current magnitude and direction, and results in the family of curves depicted in FIG. 4, and described below.

The computer-based control unit 178 of FIG. 1a is supplied with operating power from the vehicle storage battery (not shown), and comprises a microcomputer (uC) 180, an input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 130. Program instructions are described below in reference to the flow diagram of FIG. 5.

The primary control unit input is an oscillatory vehicle speed signal on line 188, which may be obtained from a conventional speed pickup, not shown. The speed signal is applied to the I/O device 182 through the input counter 184, which divides the frequency of the speed signal by a predetermined factor. The PWM command for exciting coil 130 is applied to a bidirectional PWM driver 186 (which may take the form of a conventional H-switch driver) for correspondingly modulating the coil 130 with current from the vehicle storage battery, not shown. A signal indicative of the coil current is developed for the PWM driver 186 on line 176 with a suitable current shunt, such signal being applied as an input to an analog port of the I/O device 182 for use in a closed-loop control of the coil current. Open-loop voltage control may alternately be employed, if desired.

Figure 4:
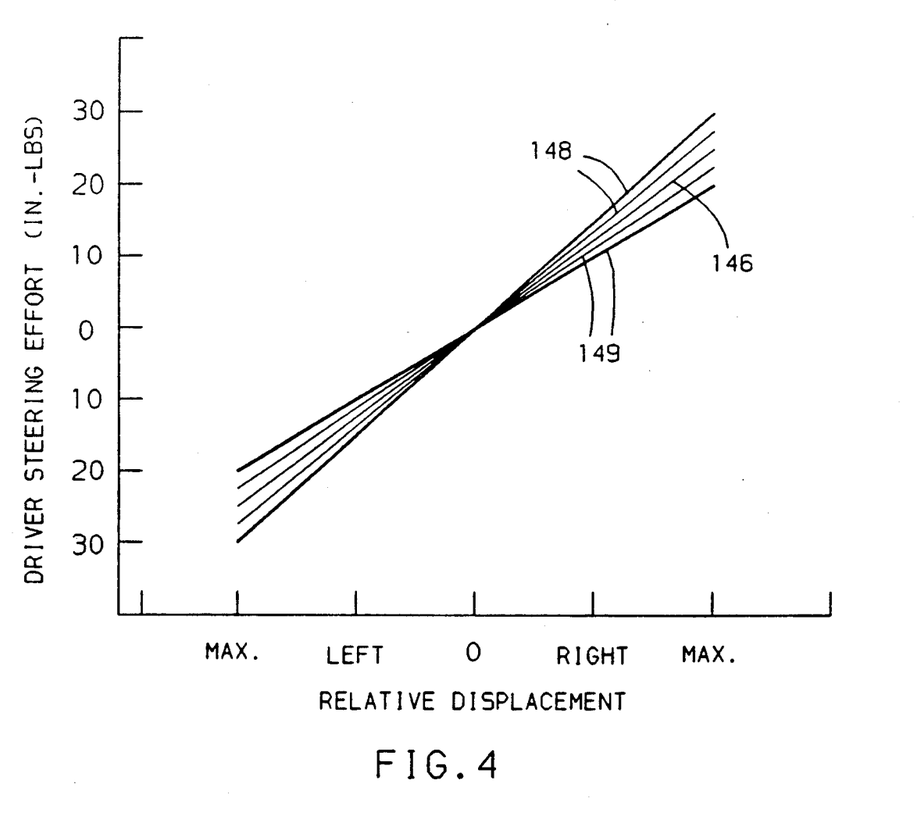
FIG. 4 depicts the variation in driver steering effort achieved by the control valve and controller of FIG. 1a for various vehicle speeds.

According to the illustrated embodiment, the combined effect of the torsion bar 90 and the permanent magnet flux path centering forces produce an intermediate level of steering assist, represented by the trace 146 in FIG. 4. This level of assist is most suitable for an intermediate vehicle speed such as 30 miles per hour. With increasing vehicle speed, the control unit 178 begins energizing the exciting coil 130 with progressively increasing levels of a first polarity current to increase the driver steering effort per unit relative displacement of the valve spool 54 and valve body 64, as indicated by the traces 148. With decreasing vehicle speed, the control unit 178 begins energizing the exciting coil 130 with progressively increasing levels of the opposite polarity current to reduce the driver steering effort per unit relative displacement of the valve spool 54 and valve body 64, as indicated by the traces 149. This produces a variable effort effect since the level of power assist is directly related to the relative displacement of the valve spool 54 and valve body 64.

The maximum relative displacement limits (MAX) are defined by the splined lost motion coupling between spool shaft 18 and pinion gear 28. Once the maximum displacement has occurred, further rotation of the steering wheel is mechanically transmitted to the pinion gear 28 via the coupling. In the illustrated embodiment, the coupling permits relative displacements of approximately ±4.5 mechanical degrees (N/4 electrical degrees), the region over which the combination of the permanent magnet and electromagnetic centering forces is linear or quasi-linear.

It should be recognized, of course, that alternative control methods may be employed. For example, the torsion bar 90 could be designed so that the combination of its centering force and the permanent magnet flux centering force provides an extreme level of steering assist. In this event, the control unit 178 could effect unidirectional current control of the exciting coil 130 to adjust the overall resilience of the valve body/spool coupling. In such case, the bidirectional PWM driver 186 could be replaced with a unidirectional driver.

As a further control alternative, the torsion bar 90 could be dispensed with completely. In such an arrangement, the base level (that is, no coil current) of steering assist would be determined solely by the centering force produced by the flux of the permanent magnet flux path. As with the other embodiments, such centering force could be varied through energization of the exciting coil 130 with either unidirectional or bidirectional current.

Figure 5:
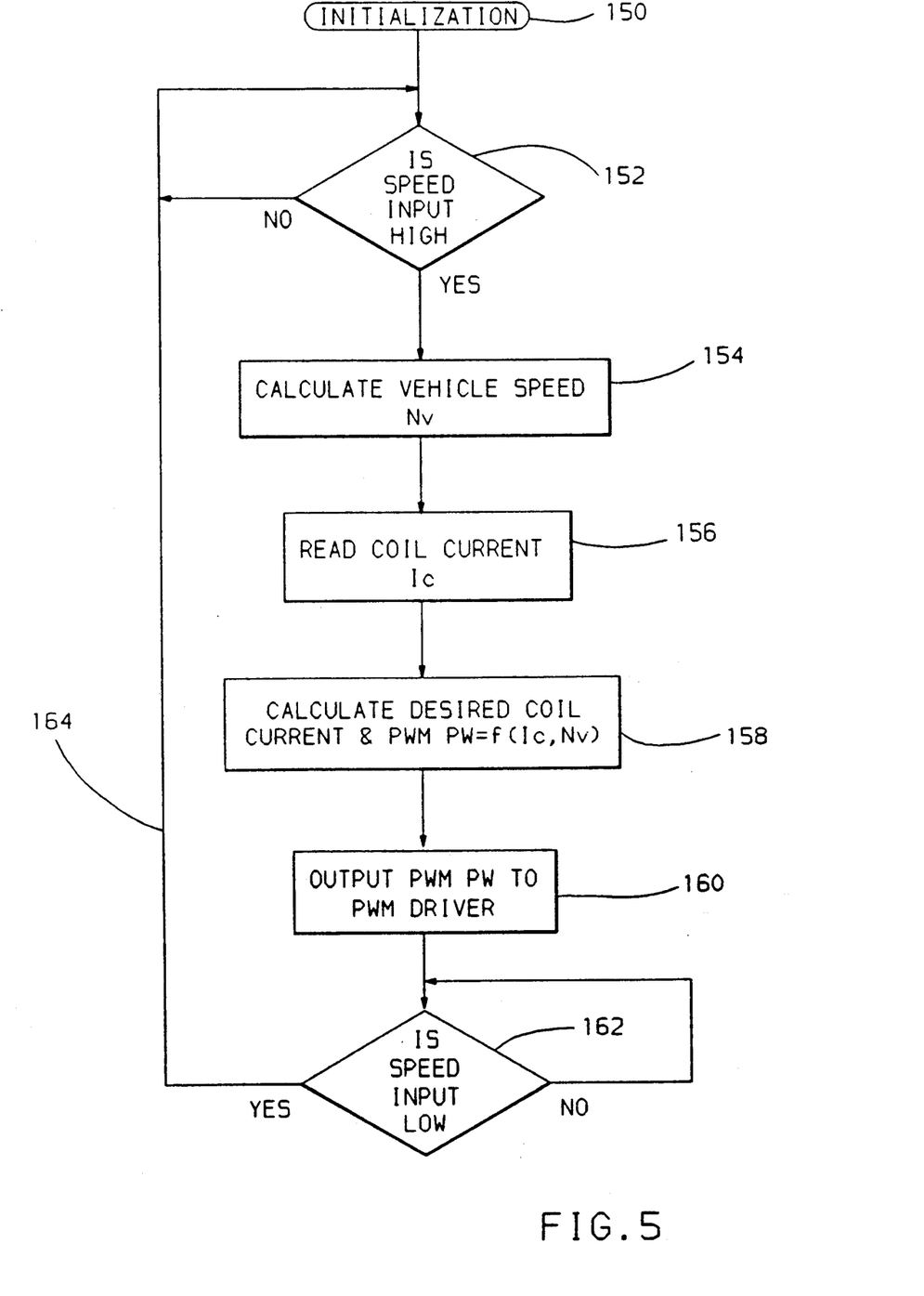
FIG. 5 is a flow diagram representative of computer program instructions executed by the computer based controller of FIG. 1a in controlling the excitation of the electromagnetic mechanism of this invention.

Regardless of the control method employed, FIG. 5 depicts a simplified flow diagram representative of computer program instructions which would be executed by the computer-based control unit 178 of FIG. 1a in carrying out the control. The block 150 designates a series of program instructions executed at the initiation of each period of vehicle operation for initializing the various registers and program variable to predetermined values. Thereafter, the blocks 152-162 are repeatedly executed as indicated by the flow diagram line 164.

The decision blocks 152 and 162 detect a low to high transition of the vehicle speed signal output of input counter 184. When the transition is detected, the instruction blocks 154, 156, 158 and 160 are sequentially executed to calculate the vehicle speed $N_v$, to read the coil current value $I_c$, and to calculate and output a PWM pulse width to the PWM driver 186. Calculation of the vehicle speed at block 154 is based on the elapsed time between low-to-high transitions of the input counter carry bit, such time being inversely proportional to vehicle speed $N_v$. Calculation of the PWM pulse width command is based on the deviation of the desired coil current from the measured coil current $I_c$, the desired current being determined in accordance with vehicle speed, as indicated in FIG. 4.

While this invention has been described in reference to the illustrated embodiment, various modifications will occur to those skilled in the art. In essential form, the control apparatus of this invention comprises a stationary magnetic circuit and a rotary magnetic circuit including at least two relatively rotatable elements. The function of the magnetic circuits can be achieved with alternate configurations, and it should be understood that the scope of this invention is defined solely by the appended claims. Moreover, various control parameters, such as driver preference (light, medium or heavy effort) or pressure feedback may be used, either separately or in combination with the above-described vehicle speed parameter.

The embodiments of the invention in which an exclusive property or privilege is claimed are defined as follows:

1. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for varying the driver steering effort required to produce a given power assist steering force, the apparatus comprising:
   an annular stationary coil disposed within a stationary flux conducting element in proximity to said hydraulic elements;
   a cylindrical radially magnetized permanent magnet ring connected for rotation with one of said pair of hydraulic elements;
   outer and inner cylindrical magnetic flux conducting elements disposed in radial opposition about said permanent magnet ring to define outer and inner magnetic flux paths which, together with said stationary flux conducting element, couple said permanent magnet ring to said stationary coil, the inner and outer magnetic flux conducting elements each having a given number of teeth extending radially toward said permanent magnet ring, defining inner and outer magnetic air gaps between the permanent magnet ring and the inner and outer flux conducting elements, respectively, the inner air gap having a radial dimension which is larger than that of the outer air gap so as to compensate for asymmetry inherent in said radial opposition; and
   coupling means for mutually coupling the inner and outer magnetic flux conducting elements for rotation with the other of said pair of hydraulic elements so that magnetic forces tending to center the permanent magnet ring within said inner and outer flux conducting elements also tend to center said pair of hydraulic elements.

2. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for varying the driver steering effort required to produce a given power assist steering force, the apparatus comprising:
   an annular stationary coil disposed within a stationary flux conducting element in proximity to said hydraulic elements;
   a cylindrical radially magnetized permanent magnet ring connected for rotation with one of said pair of hydraulic elements;
   outer and inner cylindrical magnetic flux conducting elements disposed in radial opposition about said permanent magnet ring to define outer and inner magnetic flux paths which, together with said stationary flux conducting element, couple said permanent magnet ring to said stationary coil, the inner and outer magnetic flux conducting elements each having a given number of teeth extending radially toward said permanent magnet ring, defining inner and outer magnetic air gaps between the permanent magnet ring and the inner and outer flux conducting elements, respectively, the teeth of the outer flux conducting element being rounded relative to the teeth of said inner flux conducting element to effectively increase the outer magnetic air gap, thereby to compensate for asymmetry inherent in said radial opposition; and
   coupling means for mutually coupling the inner and outer magnetic flux conducting elements for rotation with the other of said pair of hydraulic elements so that magnetic forces tending to center the permanent magnet ring within said inner and outer flux conducting elements also tend to center said pair of hydraulic elements.

3. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for varying the driver steering effort required to produce a given power assist steering force, the apparatus comprising:

an annular stationary coil disposed within a stationary flux conducting element in proximity to said hydraulic elements;

a cylindrical radially magnetized permanent magnet ring supported on a rotary hub connected for rotation with one of said pair of hydraulic elements;

outer and inner cylindrical magnetic flux conducting elements disposed in radial opposition about said permanent magnet ring to define outer and inner magnetic flux paths which, together with said stationary flux conducting element, couple said permanent magnet ring to said stationary coil; and coupling means including a nonmagnetic ring element mutually coupling the inner and outer magnetic flux conducting elements for rotation with the other of said pair of hydraulic elements so that magnetic forces tending to center the permanent magnet ring within said inner and outer flux conducting elements also tend to center said pair of hydraulic elements, said permanent magnet extending from said rotary hub into a recess formed on said nonmagnetic ring element to mitigate axial asymmetry between said permanent magnet ring and said magnetic flux conducting elements.

* * * * *